(12) United States Patent
Hirosaki et al.

(10) Patent No.: US 8,946,981 B2
(45) Date of Patent: Feb. 3, 2015

(54) PHOSPHOR, LIGHTING FIXTURE, AND IMAGE DISPLAY DEVICE

(75) Inventors: Naoto Hirosaki, Ibaraki (JP); Takahashi Takeda, Ibaraki (JP); Tatsuya Horie, Ibaraki (JP)

(73) Assignee: National Institute for Materials Science, Tsukuba-shi (JP)

( * ) Notice: Subject to any disclaimer, the term of this patent is extended or adjusted under 35 U.S.C. 154(b) by 191 days.

(21) Appl. No.: 13/818,975

(22) PCT Filed: Aug. 26, 2011

(86) PCT No.: PCT/JP2011/069326
§ 371 (c)(1),
(2), (4) Date: Feb. 25, 2013

(87) PCT Pub. No.: WO2012/026592
PCT Pub. Date: Mar. 1, 2012

(65) Prior Publication Data
US 2013/0147341 A1    Jun. 13, 2013

(30) Foreign Application Priority Data

Aug. 27, 2010  (JP) .................................. 2010-190243

(51) Int. Cl.
*C09K 11/77* (2006.01)
*C09K 11/08* (2006.01)
*H01J 1/63* (2006.01)

(52) U.S. Cl.
CPC ......... *C09K 11/7787* (2013.01); *C09K 11/0883* (2013.01); *C09K 11/7706* (2013.01); *H01J 1/63* (2013.01)

USPC ...................................... 313/483; 252/301.4 F

(58) Field of Classification Search
None
See application file for complete search history.

(56) References Cited

U.S. PATENT DOCUMENTS

| 2003/0006400 A1 | 1/2003 | Noguchi |
| 2003/0094893 A1 | 5/2003 | Ellens |
| 2006/0192178 A1 | 8/2006 | Hirosaki |
| 2006/0290269 A1 | 12/2006 | Fukuda |
| 2007/0007494 A1 | 1/2007 | Hirosaki |

(Continued)

FOREIGN PATENT DOCUMENTS

| EP | 0155047 A1 | 2/1985 |
| EP | 1296376 A2 | 3/2003 |
| JP | 1985-206889 | 10/1985 |

(Continued)

OTHER PUBLICATIONS

Supplemental European Search Report for Equivalent European patent Application No. 11820052.6-1355.

(Continued)

*Primary Examiner* — Britt D Hanley
(74) *Attorney, Agent, or Firm* — Trojan Law Offices

(57) ABSTRACT

A phosphor substituting the conventional sialon phosphor or oxide phosphor activated by rare earth and an application thereof are provided. The phosphor of the present invention comprises an inorganic crystal including at least La, Si, Al, N (nitrogen), M element (M is at least one kind of element selected from the group consisting of Ce, Pr, Nd, Sm, Eu, Gd, Tb, Dy, Ho, Er, Tm and Yb), and O (oxygen) if necessary and the inorganic crystal is a host crystal, which is $LaSi_9Al_{19}N_{32}$ crystal or a solid-solution crystal thereof, activated by the M element.

10 Claims, 6 Drawing Sheets

(56) References Cited

U.S. PATENT DOCUMENTS

| | | |
|---|---|---|
| 2007/0018567 A1 | 1/2007 | Hirosaki |
| 2007/0108896 A1 | 5/2007 | Hirosaki |

FOREIGN PATENT DOCUMENTS

| | | |
|---|---|---|
| JP | 2002-363554 A2 | 12/2002 |
| JP | 3668770 B | 12/2002 |
| JP | 2003-055657 A | 2/2003 |
| JP | 2003-206481 A2 | 7/2003 |
| JP | 2004-285363 A | 10/2004 |
| JP | 2005-112922 A | 4/2005 |
| JP | 2005-255895 A | 9/2005 |
| JP | 3921545 B | 9/2005 |
| JP | 2006-008721 A | 1/2006 |
| JP | 3837588 B | 1/2006 |
| JP | 2006-335832 A | 12/2006 |
| JP | 2009-024030 A | 2/2009 |
| WO | WO 2005/019376 A1 | 3/2005 |

OTHER PUBLICATIONS

J. Grins, et al., "High-resolution Electron Microscopy of a Sr-containing Sialon Polytypoid Phase," Journal of the European Ceramic Society, vol. 19, pp. 2723-2730 (1999).

Fig. 2

Composition formula: LaSi9Al19N32
Formula weight (Z): 2
Crystal system: Monoclinic
Space group: C 2/m (No.12)
Lattice constants (Å)

| a | b | c |
|---|---|---|
| 5.3080(3) | 9.1930(4) | 26.3970(13) |

Angle (°)

| $\alpha$ | $\beta$ | $\gamma$ |
|---|---|---|
| 90 | 93.848(1) | 90 |

Atomic coordinate and occupancy rate

| | x | y | z | Site occupancy rate |
|---|---|---|---|---|
| La | 0.5000 | 0.0000 | 0.5000 | 1 |
| (Si, Al)1 | 0.28148(14) | 0.16710(8) | 0.34545(3) | 1 |
| (Si, Al)2 | 0.97907(13) | 0.16670(8) | 0.43711(2) | 1 |
| (Si, Al)3 | 0.7828(2) | 0.0000 | 0.34544(4) | 1 |
| (Si, Al)4A | 0.3535(3) | 0.0000 | 0.06113(9) | 0.621(3) |
| (Si, Al)4B | 0.3444(6) | 0.0000 | 0.03271(15) | 0.379(3) |
| (Si, Al)5A | −0.1461(2) | 0.16686(15) | 0.06092(7) | 0.623(3) |
| (Si, Al)5B | −0.1559(4) | 0.1666(2) | 0.03328(11) | 0.377(3) |
| (Si, Al)6A | −0.2816(3) | 0.0000 | 0.15497(5) | 0.836(3) |
| (Si, Al)6B | −0.2902(13) | 0.0000 | 0.1268(3) | 0.164(3) |
| (Si, Al)7A | 0.21831(17) | 0.16679(10) | 0.15499(4) | 0.846(2) |
| (Si, Al)7B | 0.2092(9) | 0.1669(6) | 0.1266(2) | 0.154(2) |
| (Si, Al)8A | −0.08342(16) | 0.16665(10) | 0.24968(5) | 0.972(4) |
| (Si, Al)8B | −0.091(7) | 0.166(4) | 0.2336(16) | 0.028(4) |
| (Si, Al)9A | 0.4168(2) | 0.0000 | 0.25017(5) | 0.943(3) |
| (Si, Al)9B | 0.407(4) | 0.0000 | 0.2219(8) | 0.057(3) |
| N1 | 0.8514(6) | 0.0000 | 0.41513(11) | 1 |
| N2 | 0.2821(4) | 0.1897(2) | 0.41517(8) | 1 |
| N3 | −0.0598(4) | 0.1665(2) | 0.32117(8) | 1 |
| N4 | 0.4411(6) | 0.0000 | 0.32349(11) | 1 |
| N5 | 1.0000 | 0.1667(3) | 0.5000 | 1 |
| N6A | 0.2425(10) | 0.1671(6) | 0.22772(10) | 0.920(4) |
| N6B | 0.243(14) | 0.167(9) | 0.237(2) | 0.080(4) |
| N7A | 0.7426(12) | 0.0000 | 0.22743(13) | 0.889(4) |
| N7B | 0.748(13) | 0.0000 | 0.2382(18) | 0.111(4) |
| N8A | −0.1226(11) | 0.1666(7) | 0.13393(11) | 0.797(4) |
| N8B | −0.116(5) | 0.167(3) | 0.1453(7) | 0.203(4) |
| N9A | 0.3785(13) | 0.0000 | 0.13430(16) | 0.792(4) |
| N9B | 0.380(6) | 0.0000 | 0.1469(9) | 0.208(4) |
| N10A | 0.181(2) | 0.1665(16) | 0.0397(2) | 0.560(4) |
| N10B | 0.184(3) | 0.166(2) | 0.0523(3) | 0.440(4) |
| N11A | −0.318(4) | 0.0000 | 0.0401(3) | 0.565(4) |
| N11B | −0.322(6) | 0.0000 | 0.0523(5) | 0.435(4) |

In all sites of (Si, Al), Si:Al=9:19, site occupancy rate: nA+nB=1 (n=integer)

PHOSPHOR, LIGHTING FIXTURE, AND IMAGE DISPLAY DEVICE

CROSS-REFERENCE TO RELATED APPLICATIONS

The present application is a U.S. National Stage Application under 35 U.S.C. 371 of PCT/JP2011/069326, filed on Aug. 26, 2011, which claims priority to Japanese Patent Application 2010-190243, filed on Aug. 27, 2010.

FIELD OF THE INVENTION

The present invention relates to a phosphor comprising an inorganic crystal including at least La, Si, Al, N (nitrogen), and an activating element, and an application thereof. More specifically, the present invention relates to a phosphor activated by the activating element and comprising $LaSi_9Al_{19}N_{32}$ crystal or a solid solution crystal thereof as a host crystal, and the application relates to a lighting device and an image display device utilizing a feature which the phosphor possesses, that is, a property of emitting light having a peak in a wavelength range from equal to or longer than 410 nm to equal to or shorter than 550 nm.

BACKGROUND OF THE INVENTION

Background Art

The phosphor is utilized in a fluorescent display tube (VFD: vacuum-fluorescent display), a field emission display (FED: Field Emission Display) or SED (Surface-Conduction Electron-Emitter Display), a plasma display panel (PDP: Plasma Display Panel), a cathode-ray tube (CRT: Cathode-Ray Tube), a white light-emitting diode (LED: Light-Emitting Diode), and so on. In any of these applications, it is necessary to provide the phosphor with energy to excite the phosphor in order to make the phosphor emit the fluorescence and the phosphor is excited by an excitation source with high energy such as a vacuum ultraviolet ray, an ultraviolet ray, an electron beam, blue light, or the like so as to emit a visible light ray. However, as a result of the phosphor being exposed to such excitation source, brightness of a phosphor tends to be lowered such that a phosphor exhibiting little degradation in the brightness is desired. Therefore, it has been proposed to utilize a phosphor comprising an inorganic crystal, as a host crystal, including nitrogen in a crystal structure thereof such as a sialon phosphor, an oxynitride phosphor, and a nitride phosphor as a phosphor having little degradation in brightness instead for the conventional phosphor such as a silicate phosphor, a phosphate phosphor, an aluminate phosphor, and a sulfide phosphor.

An example of the sialon phosphors is manufactured by a manufacturing process as generally described below. First, silicon nitride ($Si_3N_4$), aluminum nitride (AlN), and europium oxide ($Eu_2O_3$) are mixed in predetermined molar ratios and the resultant mixture is fired by a hot press method in one atmospheric pressure (0.1 MPa) of nitrogen atmosphere at 1700° C. for one hour (for example, refer to Patent Reference 1). It was reported that α-sialon activated by an Eu ion ($Eu^{2+}$) manufactured by the above process had become a phosphor emitting yellow light in a wavelength range of 550 nm to 600 nm when it was excited by blue light having a wavelength range of 450 to 500 nm. A phosphor in which a rare-earth element is added to β-type sialon is also known (refer to Patent Reference 2) and it is shown that phosphors activated by Tb, Yb, and Ag become phosphors emitting green light of 525 nm to 545 nm. It is also known that β-type sialon activated by $Eu^{2+}$ becomes a phosphor of a green color (refer to Patent Reference 3).

As an example of the oxynitride phosphor, a blue phosphor activated by Ce and having JEM phase ($LaAl(Si_{6-z}Al_z)N_{10-z}O_z$) as a host crystal (refer to Patent Reference 4) and a blue phosphor activated by Ce and having $La_3Si_8N_{11}O_4$ as a host crystal (refer to Patent Reference 5) are known.

As an example of the nitride phosphor, a red phosphor activated by $Eu^{2+}$ and having $CaAlSiN_3$ as a host crystal is known (refer to Patent Reference 6).

As a blue phosphor for applications to an image display device (VFD, FED, SED, or CRT) using an electron beam as an excitation source thereof, a phosphor having $Y_2SiO_5$ as a host crystal into which Ce is incorporated as a solid solute (refer to Patent Reference 7), and a phosphor of ZnS into which an emission ion such as Ag is incorporated as a solid solute (refer to Patent Reference 8) were reported.

A composition and a structure of $SrSi_9Al_{19}ON_{31}$ crystal as a sialon including Sr was reported (refer to Non-Patent Reference 1). A blue phosphor comprising $SrSi_9Al_{19}ON_{31}$ crystal into which Eu is incorporated as a solid solute (also referred to Sr sialon polytypoid) is known (refer to Patent Reference 9).

PRIOR ART REFERENCE

Patent Reference

[Patent Reference 1] Specification of Japanese Patent No. 3668770.
[Patent Reference 2] Japanese Patent Application Publication No. S60-206889.
[Patent Reference 3] Specification of Japanese Patent No. 3921545.
[Patent Reference 4] WO2005/019376 pamphlet.
[Patent Reference 5] Japanese Patent Application Publication No. 2005-112922.
[Patent Reference 6] Specification of Japanese Patent No. 3837588.
[Patent Reference 7] Japanese Patent Application Publication No. 2003-55657.
[Patent Reference 8] Japanese Patent Application Publication No. 2004-285363.
[Patent Reference 9] Japanese Patent Application Publication No. 2006-335832.

Non-Patent Reference

[Non-Patent Reference 1] J. Grins, et. al, "High-resolution Electron Microscopy of a Sr-containing Sialon Polytypoid Phase," Journal of the European Ceramic Society, vol. 19, pp. 2723-2730 (1999).

SUMMARY OF THE INVENTION

Problem to be Solved by the Invention

A phosphor emitting light of a violet color, a blue color, or a green color in addition to a red color and a yellow color is in demand as a phosphor having excellent durability and high brightness for applications such as a white LED and a plasma display using an ultraviolet LED as an excitation source. Further, a phosphor comprising a conventional oxynitride as a host crystal is insulating material and emission intensity thereof is low when an electron beam is irradiated. Therefore, a phosphor which emits light with high brightness when an electron beam is irradiated is in demand for an application of an image display device with an excitation source of electron beam such as FED.

An oxide phosphor disclosed in Patent Reference 7 which is used with electron beam excitation might deteriorate while being used so that the emission intensity might be lowered, thereby changing the color balance in the image display device. A sulfide phosphor disclosed in Patent Reference 8 might be decomposed while being used so that sulfur might be scattered to contaminate the device.

It is an object of the present invention to try to satisfy such demand and try to provide a phosphor substituting the conventional sialon phosphor or oxide phosphor activated by rare earth and in particular a phosphor emitting light of a violet color, a blue color, or a green color. Further, it is an object to try to provide a phosphor emitting efficiently light of a violet color, a blue color, and a green color with excitation by the electron beam. In addition, it is an object to try to provide phosphor powder exhibiting little deterioration in emission intensity at a high temperature.

Means for Solving the Problem

The present inventors, in such an environment, focused on an inorganic crystal including at least La, Si, Al, N, O element if necessary, and M element as an activating element (here, M is at least one kind of element selected from a group consisting of Ce, Pr, Nd, Sm, Eu, Gd, Tb, Dy, Ho, Er, Tm, and Yb) and intensely investigated an inorganic crystal comprising $LaSi_9Al_{19}N_{32}$ crystal or a solid-solution crystal thereof and, in particular, the inorganic crystal into which at least M ion is incorporated as a solid solute so as to eventually find out that this inorganic crystal could become a phosphor. Further, it was found that an inorganic crystal having a specific composition range, a specific solid solution state, and a specific crystal phase could be a violet phosphor, a blue phosphor, or a green phosphor having an emission peak in a wavelength range that is equal to or longer than 410 nm and is equal to or shorter than 550 nm and that the inorganic crystal could be suitable for lighting application or an image display device with excitation of an electron beam.

According to Non-patent Reference 1, the crystal structure and the composition of $SrSi_9Al_{19}ON_{31}$ crystal are disclosed by electronic microscope. And according to Patent Reference 9, it is recited that this crystal may become a blue phosphor if Eu ion is added thereto, but it is $LaSi_9Al_{19}N_{32}$ crystal that has been found out by the present inventors for the first time.

As a result of further intensive investigations on the basis of this discovery, a phosphor that exhibits an emission phenomenon with high intensity in a specific wavelength range, and a lighting device and an image display device having superior properties have been successfully provided. These are more specifically described in the following.

A phosphor according to the present invention comprises an inorganic crystal including at least La, Si, Al, N (nitrogen), M element (here, M is at least one kind of element selected from the group consisting of Ce, Pr, Nd, Sm, Eu, Gd, Tb, Dy, Ho, Er, Tm, and Yb), and O (oxygen) if necessary, and said inorganic crystal comprises $LaSi_9Al_{19}N_{32}$ crystal or a solid solution crystal of $LaSi_9Al_{19}N_{32}$ crystal as a host crystal and is a crystal of said host crystal activated by said M element.

Said host crystal may be $LaSi_9Al_{19}N_{32}$ crystal.

Said inorganic crystal could be $La_{1-x}M_xSiAl_{19}O_yN_{32-y}$ crystal (here, x satisfies: $0.001 \leq x \leq 0.99$, and y satisfies: $0.001 \leq y \leq 0.99$).

Said inorganic crystal could be $La_{1-x}Eu_xSi_9Al_{19}O_yN_{32-y}$ crystal (here, x satisfies: $0.001 \leq x \leq 0.99$, and x=y).

Said inorganic crystal could be $La_{1-x}Ce_xSiAl_{19}N_{32}$ crystal (here, x satisfies: $0.001 \leq x \leq 0.99$).

In said inorganic crystal ($La_aM_fSi_bAl_cO_dN_e$, a+b+c+d+e+f=1), an atomic fraction a of said La, an atomic fraction b of said Si, an atomic fraction c of said Al, an atomic fraction d of said O, an atomic fraction e of said N, and an atomic fraction f of said M element may satisfy:

$0.0001 \leq a \leq 0.03$ (i), $0.1 \leq b \leq 0.2$ (ii), $0.25 \leq c \leq 0.4$ (iii), $0 \leq d \leq 0.1$ (iv), $0.4 \leq e \leq 0.55$ (v), and $0.0001 \leq f \leq 0.02$ (vi).

An atomic fraction a of said La, an atomic fraction b of said Si, an atomic fraction c of said Al, an atomic fraction d of said O, an atomic fraction e of said N, and an atomic fraction f of said M element may satisfy:

$0.015 \leq a \leq 0.018$ (vii), $0.13 \leq b \leq 0.16$ (viii), $0.29 \leq c \leq 0.33$ (ix), $0 \leq d \leq 0.03$ (x), $0.48 \leq e \leq 0.52$ (xi), and $0.0005 \leq f \leq 0.01$ (xii).

The phosphor according to the present invention could exhibit light emission with a peak wavelength in a wavelength range from 410 nm to 550 nm upon irradiation of an excitation source being any one of an ultraviolet ray, a visible light ray, an electron beam, and an X-ray.

According to the present invention, a lighting device constituted of an emission light source to emit light of a wavelength from 250 to 440 nm; and a phosphor to convert the light of the emission light source into light of a different wavelength is characterized in that said phosphor includes the above-mentioned phosphor such that the above-mentioned problem may be solved.

An image display device including an excitation source and a phosphor according to the present invention is characterized in that said phosphor includes the above-mentioned phosphor.

Effect of the Invention

A phosphor according to the present invention comprises an inorganic crystal including at least La, Si, Al, N (nitrogen), M element (here, M is at least one kind of element selected from the group consisting of Ce, Pr, Nd, Sm, Eu, Gd, Tb, Dy, Ho, Er, Tm, and Yb), and O (oxygen) if necessary, and the inorganic crystal is a crystal of a host crystal activated by M element while the host crystal is $LaSi_9Al_{19}N_{32}$ crystal or a solid solution crystal thereof. The phosphor of the present invention emits light of a violet color, a blue color, or a green color and it is possible to control emission intensity and emission wavelength thereof by adjusting the activation amount of M element. Further, it is the phosphor that is extremely advantageous in the material design since concentration quenching does not occur.

BRIEF DESCRIPTION OF THE DRAWINGS

FIG. 2 is a diagram showing structure parameters of $LaSi_9Al_{19}N_{32}$ crystal.

EMBODIMENT FOR CARRYING OUT THE INVENTION

In the following, embodiments of the present invention are described in detail.

Figure 1:
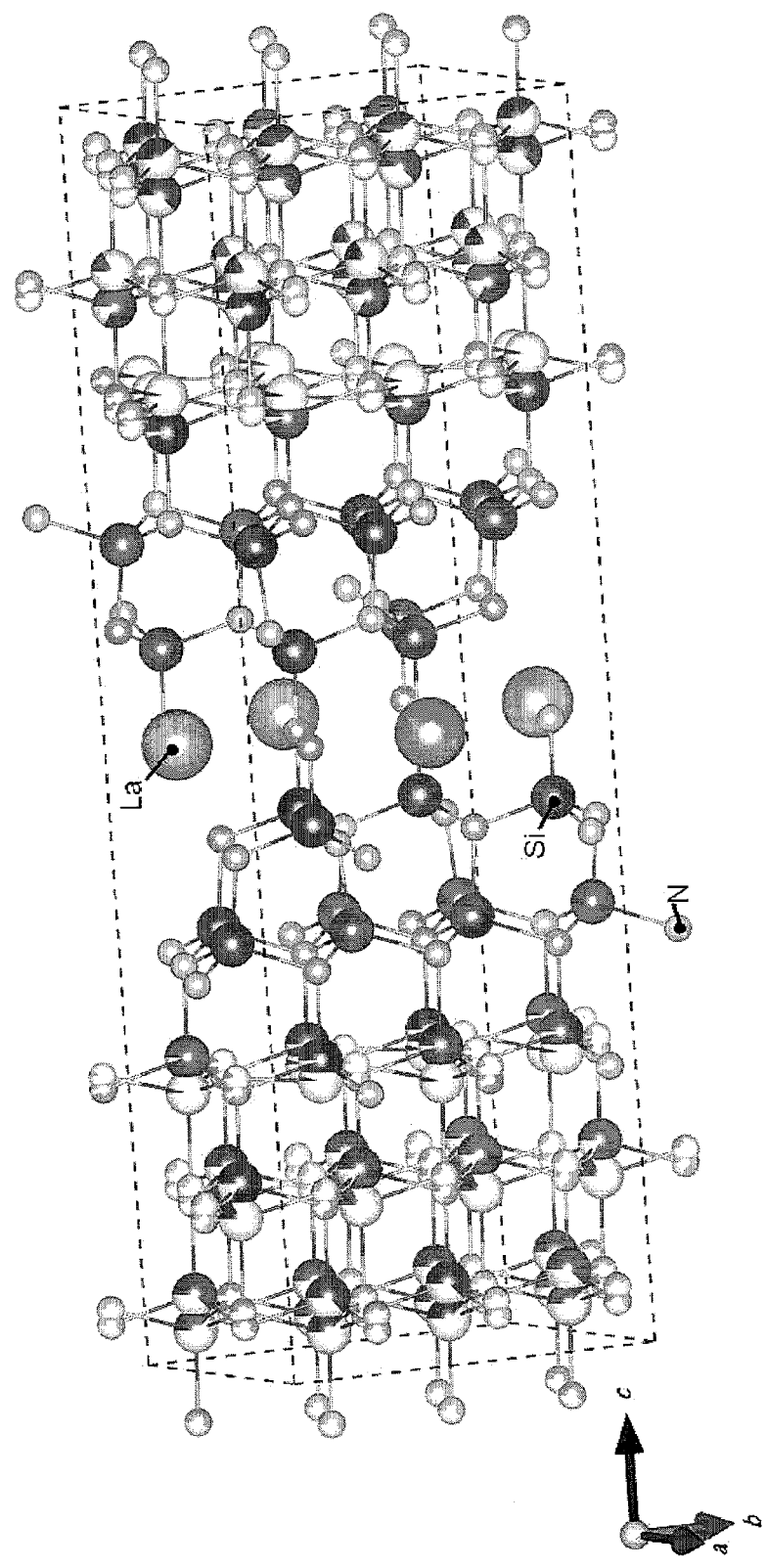
FIG. 1 is a schematic model diagram of La sialon polytypoid crystal structure.

A phosphor according to the present invention is an inorganic crystal comprising at least La, Si, Al, N (nitrogen), and M element (here, M is at least one kind of element selected from the group consisting of Ce, Pr, Nd, Sm, Eu, Gd, Tb, Dy, Ho, Er, Tm, and Yb). Here, the above-mentioned inorganic crystal may include O (oxygen) if necessary. Further, in the phosphor according to the present invention, a host crystal is $LaSi_9Al_{19}N_{32}$ crystal or a solid solution crystal of $LaSi_9Al_{19}N_{32}$ crystal and is activated by the above-mentioned M element (M ion is incorporated into the host crystal as a solid solute). The phosphor according to the present invention may be called as La sialon polytypoid. A schematic model diagram of this crystal structure is illustrated in FIG. 1.

$LaSi_9Al_{19}N_{31}$ crystal is a sialon crystal having a similar structure to that of $SrSi_9Al_{19}ON_{31}$ crystal (refer to Non-Patent Reference 1).

$LaSi_9Al_{19}N_{32}$ crystal or a solid solution crystal thereof may be identified by the X-ray diffraction technique or the neutron diffraction technique. The crystal structure of $SrSi_9Al_{19}ON_{31}$ crystal is described in detail in Non-Patent Reference 1 (the contents of Non-Patent Reference 1 are incorporated herein by reference) and the X-ray diffraction pattern of $LaSi_9Al_{19}N_{32}$ crystal or a solid solution crystal thereof may be determined unambiguously by using the model, in which Sr site is replaced with La, in accordance with data of the space group and atom positions described in Non-Patent Reference 1. These crystal structure parameters are shown in FIG. 2. It may be confirmed that it is $LaSi_9Al_{19}N_{32}$ crystal that is obtained in the product of the present invention by comparing the X-ray diffraction result of the product with calculated values using the model. Here, the present invention may also encompass, as part of the present invention, a crystal having lattice constants changed by replacing constituent elements with other elements in addition to pure $LaSi_9Al_{19}N_{32}$ crystal and such crystal may be referred to as solid solution crystal of $LaSi_9Al_{19}N_{32}$ crystal or crystal having the same crystal structure as $LaSi_9Al_{19}N_{32}$ crystal.

There is $La_{1-x}M_xSi_9Al_{19}O_yN_{32-y}$ crystal as one inorganic crystal constituting a phosphor of the present invention. Here, x satisfies: $0.001 \leq x \leq 0.99$ and y satisfies: $0.001 \leq y \leq 0.99$. The phosphor having this composition is a phosphor of high emission efficiency and of emission intensity. It is preferable that M is Eu or Ce such that the emission intensity is high. Also, it may also be good if x=y.

In particular, $La_{1-x}Eu_xSi_9Al_{19}O_yN_{32-y}$ cryatal (here, x satisfies: $0.001 \leq x \leq 0.99$ and y satisfies: $0.001 \leq y \leq 0.99$), where M element is Eu, is desirable as an inorganic crystal constituting a phosphor of the present invention becasue it exhibits high emission intensity. From the view point of high emission efficiency and emission intensity, $La_{1-x}Eu_xSi_9Al_{19}O_yN_{32-y}$ crystal (here, x satisfies: $0.001 \leq x \leq 0.99$ and x=y) is more desirable.

$La_{1-x}Ce_xSi_9Al_{19}N_{32}$ crystal (here, x satisfies: $0.001 \leq x \leq 0.99$), where M element is Ce, is desirable as one of the inorganic crystals constituting the phosphor of the present invention beacuse it exhibits high emission intensity.

In an inorganic crystal constituting a phosphor of the present invention, an atomic fraction a of La, an atomic fraction b of Si, an atomic fraction c of Al, an atomic fraction d of O, an atomic fraction e of N, and an atomic fraction f of M element satisfy:

$0.0001 \leq a \leq 0.03$ (i), $0.1 \leq b \leq 0.2$ (ii), $0.25 \leq c \leq 0.4$ (iii), $0 \leq d \leq 0.1$ (iv), $0.4 \leq e \leq 0.55$ (v), and $0.0001 \leq f \leq 0.02$ (vi), such that the phosphor being constituted of the inorganic crystal may exhibit high emission intensity so as to be desirable.

Further, a phosphor, in which an atomic fraction a of La, an atomic fraction b of Si, an atomic fraction c of Al, an atomic fraction d of O, an atomic fraction e of N, and an atomic fraction f of M element satisfy:

$0.015 \leq a \leq 0.018$ (vii), $0.13 \leq b \leq 0.16$ (viii), $0.29 \leq c \leq 0.33$ (ix), $0 \leq d \leq 0.03$ (x), $0.48 \leq e \leq 0.52$ (xi), and $0.0005 \leq f \leq 0.01$ (xii), in particular exhibits high emission intensity so as to be desirable.

A phosphor according to the present invention emits light having a peak wavelength in a range from 410 nm to 550 nm upon irradiation by an excitation source, which is any one of an ultraviolet ray, a visible light ray, an electron beam, and an X-ray, such that it can be utilised as a violet phosphor, a blue color phosphor, and a green color phosphor, which can be exited by the ultraviolet ray, the visible light ray, the electron beam, and the X-ray.

Since the phosphor of the present invention can be excited by light of 250 to 440 nm, it can be utilized for a lighting device comprising an emission source to emit light of 250 to 440 nm and a phosphor to convert the above-mentioned light of the emission source into light of different wavelength.

The phosphor of the present invention can be utilized for an image display device including an excitation source and a phosphor since it emits light having a peak wavelength in a wavelength range from 410 nm to 550 nm upon irradiation of an excitation source of an ultraviolet ray, a visible light ray, an electron beam, or an X-ray.

The phosphor of the present invention may include an element other than La, Si, Al, N, M element and O. In particular, boron and carbon may be taken from a furnace body or a crucible during synthesization at a high temperature, but have little effect on the emission performance if the content thereof is not more than 500 ppm.

If the phosphor of the present invention is used in a powder state, it is preferable that the average particle diameter is in a range that is at least 0.1 μm and does not exceed 20 μm in consideration of dispersibility into a resin and fluidity of the substance in a powder state. The emission intensity may be improved by generating single crystalline particles in this range from the powder substance.

Since the phosphor of the present invention efficiently emits light having a peak in a wavelength range from 410 nm to 550 nm upon excitation of the ultraviolet ray or visible light having a wavelength that is at least 250 nm and does not exceed 440 nm, the phosphor is suitable for application to the white LED. The color of emission differs depending on the composition. Since the phosphor of the present invention emits light upon irradiation of light of 253.7 nm emitted from mercury atom or a vacuum ultraviolet radiation ray, it is suitable for application to a plasma display, a fluorescent light, and a mercury lamp.

Moreover, the phosphor of the present invention may also be excited by the electron beam or the X-ray. Since the phosphor of the present invention, in particular, emits light more efficiently by the electron beam excitation than other nitride phosphors, the phosphor is suitable for application to the image display device in which the electron beam is used as the excitation source.

The phosphor of the present invention may be constituted of, in addition to the above-mentioned inorganic crystal, a mixture with an amorphous phase and another crystal phase other than the inorganic crystal.

The other crystal phase or the amorphous phase can be, for example, inorganic substance having electric conductivity. For example, in the VFD or the FED, if the phosphor of the present invention is excited by the electron beam, it is preferable that the phosphor has electric conductivity to some extent such that electrons are not accumulated on the phosphor, but are released outside. The inorganic substance having electric conductivity is oxide, oxynitride, and nitride, which include at least one kind of element selected from Zn, Ga, In, and Sn, or a combination thereof. In particular, indium oxide and indium tin oxide (ITO) are desirable since the emission intensity is hardly lowered and the electric conductivity is high.

While the phosphor of the present invention emits light of a violet color, a blue color, or a green color, if it is necessary to mix the light with other light of another color such as a yellow color and a red color, another inorganic phosphor which emits light of the other color can be mixed in as appropriate. As another inorganic phosphor, it is possible to utilize a phosphor having oxide, sulfide, oxysulfide, oxynitride, or nitride crystal as a host crystal. When the durability of the mixed phosphor is required, a phosphor having oxynitride or nitride crystal as the host crystal is desirable. The phosphor having the oxynitride or nitride crystal as the host crystal is, for example, α-sialon:Eu yellow phosphor; β-sialon:Eu green phosphor; α-sialon:Ce blue phosphor; red phosphor such as $CaAlSiN_3$:Eu and $(Ca,Sr)AlSiN_3$:Eu ($CaAlSiN_3$ crystal in which Ca is partially replaced with Sr); blue phosphor having JEM phase as a host crystal $(LaAl(Si_{6-z}Al_z)N_{10-z}O_z)$:Ce); $La_3Si_8N_{11}O_4$:Ce blue phosphor; AlN:Eu blue phosphor; or the like.

Phosphors of the present invention have different excitation spectra and fluorescent spectra depending on their compositions such that it is possible to combine appropriately and selectively these different phosphors in order to design combined phosphors to emit a variety of emission spectra. In a specific embodiment, the combined phosphor may be designed to obtain a necessary spectrum according to the application.

A method of manufacturing a phosphor according to the present invention is not particularly limited hereto, but, as an example, the following method may be utilized.

The raw material mixture includes metal including La, La oxide, La carbonate, La nitride, La fluoride, La chloride, La oxynitride, or a combination thereof; raw material including silicon; raw material including aluminum; and metal including element solid-solved in the above-mentioned host crystal such as M element, oxide thereof, carbonate thereof, nitride thereof, fluoride thereof, chloride thereof, oxynitride thereof, or a combination thereof. This raw material mixture is filled in a container in a state where a relative bulk density of not exceeding 40% is maintained. The mixture is then fired in a nitrogen atmosphere that is at least 0.1 MPa and not exceeding 100 MPa in a temperature range that is at least 1500° C. and does not exceed 2200° C. In this way, a phosphor of the present invention can be manufactured wherein the phosphor comprises $LaSi_9Al_{19}N_{32}$ crystal or a solid solution crystal thereof, into which at least M element is incorporated as a solid solute. The optimum firing temperature may vary according to the composition, so that it can be optimized for each composition as appropriate. In general, the firing is preferably performed in a temperature range that is at least 1700° C. and does not exceed 2000° C. Thus, the phosphor exhibiting high emission intensity can be obtained. The generation rate of a solid solution crystal may be low if the firing temperature is lower than 1500° C. On the other hand, if the firing temperature exceeds 2200° C., a special device is required, which is industrially undesirable.

Raw material including silicon may be metal silicon, silicon oxide, silicon nitride, organic precursor including silicon, silicon diimide, amorphous body obtained by heat-treating silicon diimide, and so on, but it could be silicon nitride in general. Silicon nitride has high reactivity and it is possible to obtain highly-pure product of silicon nitride, and it is further advantageous that silicon nitride is produced as industrial raw material and is readily available. The silicon nitride includes α-type, β-type, and amorphous body, and a mixture thereof.

Raw material including aluminum is metal aluminum, aluminum oxide, aluminum nitride, organic precursor including aluminum, and so on, but it may be desirable to utilize a mixture of aluminum nitride and aluminum oxide in general. These have high reactivity and it is possible to obtain highly-pure product thereof, and it is further advantageous that these are produced as industrial raw material and are readily available. The respective amounts of aluminum nitride and aluminum oxide may be designed from a ratio of oxygen and nitrogen in the host crystal of the present invention to be targeted.

In order to improve reactivity in the firing process, an inorganic compound which forms a liquid phase at a temperature equal to or less than the firing temperature may be added to the raw material mixture, as appropriate. As the inorganic compound, what produces a stable liquid phase at the reaction temperature is desired, and fluoride, chloride, iodide, bromide, or phosphate of element Li, Na, K, Mg, Ca, Sr, Ba, and Al is suitable. Further, such inorganic compound may be added singly or be added together in a combination of two or more kinds thereof. In particular, calcium fluoride and aluminum fluoride have high capability to enhance the reactivity in the synthesis and hence are desirable. Although the amount of addition of the inorganic compound is not particularly limited thereto, but the amount of 0.1 weight part or more and 10 weight part or less is effectively added to 100 weight part of the mixture of the metal compounds constituting the raw material mixture so as to render in particular a big effect. The reactivity is not so improved if the amount of addition is smaller than 0.1 weight part, and the brightness of the phosphor may be lowered if the amount is larger than 10 weight part. If the mixture to which these inorganic compounds are added is fired, the reactivity is improved so that the particle growth is promoted in a relatively short period of time so as to yield single crystals with large particle diameters, and the brightness of the phosphor is improved.

As the nitrogen atmosphere, a gaseous atmosphere in a pressure range that is at least 0.1 MPa and does not exceed 100 MPa is desirable. It is more desirable that the pressure range is at least 0.5 MPa and does not exceed 10 MPa. When silicon nitride is used as a raw material and the firing process is performed in a nitrogen atmosphere of 0.1 MPa or lower at a temperature of 1820° C. or higher, the raw material tends to decompose easily and it is not so desirable. The thermal decomposition of the raw material can be suppressed if the pressure is 0.5 MPa or higher. It is possible to surely suppress the thermal decomposition of the raw material if the pressure is at least 10 MPa, but a special device is required if the pressure is 100 MPa or higher, which is inappropriate for the industrial production.

In the case where the raw material mixture is in fine powder of a particle diameter of several micrometers, the raw material mixture after completion of the mixing process exhibits morphology in which the fine powder of a particle diameter of several micrometers aggregates to a size of several hundreds of micrometers to several millimeters (hereinafter referred to as "powder aggregate"). In the present invention, the powder aggregate is fired in a state that the packing fraction is maintained with the bulk density not exceeding 40%. It is more desirable that the bulk density does not exceed 20%. Here, the term of the relative bulk density means the ratio of a value (bulk density) given by dividing the mass of powder material packed in the container by the capacity of the container to the real density of the substance of the powder material. In a typical sialon production, a hot pressing method in which heating is conducted as it is pressurized or a manufacturing method of firing after die molding (powder compacting) is employed, and hence the firing process is conducted in a state where the powder packing fraction is high. In the present invention, however, the powder aggregate of a mixture in which the particle size is made uniform is charged into a vessel or the like with a packing fraction of a bulk density that does not exceed 40% without applying any mechanical force or without molding with a die in advance. If necessary, the powder aggregate may be subject to particle size control by granulating to an average particle diameter that does not exceed 500 μm by using a sieve or an air classifier. Otherwise, the powder aggregate may be granulated directly into a shape of 500 μm or smaller by using a spray dryer. A container of boron nitride has an advantage of little reactivity with the phosphor.

The reason why the firing process is performed while the bulk density is maintained not to exceed 40% is to fire the raw material powder while a free space is maintained around the raw material powder. The optimal bulk density depends on the shapes and surface conditions of the granulated particles, but it is typically desirable that the bulk density does not exceed 20%. In this way, each of crystals of reaction products grows in a free space, so that it is likely that the crystals have smaller chance to come into contact with each other, whereby crystals with a smaller number of surface defects are synthesized. Therefore, a high-brightness phosphor may be obtained. When the bulk density exceeds 40%, partial densification takes place during the firing so that a dense sintered body appears, which hinders crystal growth. As a result, the brightness of the phosphor may be reduced. And it is hard to obtain powder products with fine particles. And the size of the powder aggregate of 500 μm or smaller is particularly desirable since excellent grinding properties (grindability) may be achieved after the firing.

Then, the powder aggregate having a packing fraction of 40% or smaller is fired under the above-mentioned condition. The furnace used for firing may be heated by metal resistance heating or graphite resistance heating since the firing temperature is high and the firing atmosphere is nitrogen. An electric furnace utilizing carbon as high temperature material for the furnace is desirable. For firing, a sintering method in which no mechanical pressure is applied from the outside, such as pressureless sintering method and gas-pressure sintering method, is desirable for performing firing while maintaining the bulk density in a predetermined range.

In the case where the powder aggregate obtained by firing gets hard, the aggregate is ground with a mill that is usually industrially employed, for example, a ball mill, jet mill, and the like. Among them, the ball mill is a milling method that can easily achieve the particle size control. Balls and pots to be utilized in this occasion are desirably made of silicon nitride sintered body or sialon sintered body. Grinding is performed until an averaged particle diameter becomes 20 μm or smaller. It is particularly desirable that the averaged particle diameter becomes at least 20 nm and does not exceed 10 μm. When the averaged particle diameter exceeds 20 μm, the powder fluidity and dispersibility into resin deteriorate, and the emission intensity may become non-uniform so as to vary from part to part when a light emitting device is built by combining the phosphor with a light-emitting element. When the averaged particle diameter is equal to or less than 20 nm, it becomes more difficult to handle the phosphor powder. If an objective particle diameter cannot be obtained only by grinding, classification can be utilized in combination with the grinding. Sieving, air classification, and settling in a liquid can be employed as means of classification.

Further, by washing the fired compound with a solvent for dissolving these inorganic compounds after the firing, the contents of the inorganic compounds such as glass phases, a second phase, or impurity phases other than the phosphor contained in the reaction product is reduced so that the brightness of the phosphor is improved. As such solvent, water and aqueous solution of an acid can be used. As the aqueous solution of the acid, sulfuric acid, hydrochloric acid, nitric acid, hydrofluoric acid, a mixture of organic acid and hydrofluoric acid, or the like can be used. In particular, the mixture of sulfuric acid and hydrofluoric acid achieves a large effect. This processing is quite effective with respect to a reaction product fired at a high temperature wherein the inorganic compounds yielding a liquid phase at the firing temperature or lower have been added to the raw material mixture in advance.

Although fine phosphor powder is obtained through the above processes, heat treatment is effective in order to further improve the brightness. For this purpose, the powder after firing or the powder after particle size adjustment by pulverization and classification can be subject to heat treatment at a temperature that is at least 1000° C. and does not exceed the firing temperature. At a temperature lower than 1000° C., the effect of removing surface defects is relatively low. A temperature higher than or equal to the firing temperature is undesirable because particles of the ground phosphor aggregate again with each other. Although the atmosphere suitable for heat treatment depends on phosphor compositions, a mixed atmosphere including one or more kinds selected from among nitrogen, air, ammonia, and hydrogen can be used and a nitrogen atmosphere is particularly desirable since the nitrogen atmosphere exhibits a pronounced effect on the defect removal.

The phosphor of the present invention obtained in the above-mentioned manner is characterized by high brightness in the visible light emission. A phosphor of a specific composition, in particular, is characterized by light emission in a violet color, a blue color, or a green color, and hence it is suitable for a lighting device and an image display device. In addition, the phosphor of the present invention does not deteriorate even when exposed to a high temperature such that it has superior thermal resistance and excels in a long-term stability in an oxidizing atmosphere and a hydric environment.

The lighting device of the present invention is configured with at least a light-emitting source and the phosphor of the present invention. Acceptable lighting devices include, for example, the LED lighting device and the fluorescent lamp. The LED lighting device can be manufactured using the phosphor of the present invention and a publicly known method described, for example, in Japanese Patent Application Publication No. H05-152609, Japanese Patent Application Publication No. H07-99345, or Japanese Patent No. 2927279. In this case, it is desirable that a light-emitting source is what emits light with a wavelength of 330 to 420 nm and in particular an LED or LD emission device to emit ultraviolet (or violet) light with a wavelength of 330 to 420 nm is desirable as the light-emitting source.

Such a light-emitting element comprises those devices comprised of a nitride semiconductor such as GaN, InGaN, or the like, which can constitute a light-emitting source for emitting light of a predetermined wavelength by adjusting the composition thereof.

A lighting device which emits light of a desired color can be constructed using another phosphor having other light-emitting properties in combination with the phosphor of the present invention in addition to the way of using the phosphor of the present invention by itself in the lighting device. As an example thereof, there is a combination of: an LED or LD light-emitting device which emits an ultraviolet ray of 330 to 400 nm; a yellow phosphor which is excited by the light of this wavelength so as to emit light having an emission peak at a wavelength range that is at least 550 nm and does not exceed 600 nm; and the phosphor of the present invention (for example, blue light emission). For such yellow phosphor, α-sialon: $Eu^{2+}$ disclosed in Japanese Patent Application Publication No. 2002-363554 and $(Y, Gd)_2(Al, Ga)_5O_{12}$:Ce disclosed in Japanese Patent Application Publication No. H09-218149 can be cited. In such configuration, when the ultraviolet ray emitted by the LED or LD irradiates the phosphors, light of two colors: blue and yellow is emitted so as to produce light of a white color (i.e., a white color lighting device) by mixing these two colors.

As another example, there is a combination of: an ultraviolet LED or LD light-emitting device which emits light of 330 to 400 nm; a green phosphor which is excited by the light of this wavelength so as to emit light having an emission peak in the range that is at least 520 nm and does not exceed 550 nm; a red phosphor which is excited by the light of this wavelength so as to emit light having an emission peak in the range that is at least 600 nm and does not exceed 700 nm; and the phosphor of the present invention (for example, blue light emission). As such green phosphor, for example, β-sialon: $Eu^{2+}$ described in Japanese patent application publication No. 2005-255895 and, as such red phosphor, $CaSiAlN_3$: $Eu^{2+}$ described in WO2005/052087 pamphlet can be cited. In this configuration, when the ultraviolet ray emitted by the LED or LD irradiates the phosphors, light of three colors: red, green, and blue is emitted so as to produce light of a white color (i.e., a white color lighting device) by mixing these three colors.

In another way, there is a combination of: an LED or LD light-emitting device which emits a ultraviolet ray of 330 to 400 nm; a green phosphor which is excited by the light of this wavelength so as to emit light having an emission peak in a wavelength range that is at least 520 nm and does not exceed 550 nm; a yellow phosphor which is excited by the light of this wavelength so as to emit light having an emission peak in a wavelength range that is at least 550 nm and does not exceed 600 nm; a red phosphor which is excited by the light of this wavelength so as to emit light having an emission peak in a wavelength range that is at least 600 nm and does not exceed 700 nm; and the phosphor of the present invention (for example, blue light emission). As such green phosphor, for example, β-sialon: $Eu^{2+}$ described in Japanese patent application publication No. 2005-255895; as such yellow phosphor, α-sialon: $Eu^{2+}$ described in Japanese patent application publication No. 2002-363554 and $(Y, Gd)_2(Al, Ga)_5O_{12}$: Ce described in Japanese patent application publication No. H09-218149; and, as such red phosphor, $CaSiAlN_3$: Eu described in WO2005/052087 pamphlet can be cited. In such configuration, when the ultraviolet ray emitted by the LED or LD irradiates the phosphors, light of four colors: blue, green, yellow, and red is emitted so as to produce light of a white color or a reddish bulb color (i.e., a white or reddish bulb color lighting device) by mixing these colors.

The image display device of the present invention comprises at least an excitation source and the phosphor of the present invention and includes a vacuum fluorescent display (VFD), a field emission display (FED or SED), a plasma display panel (PDP), a cathode-ray tube (CRT), and the like. It has been confirmed that the phosphor of the present invention emits light by excitation of a vacuum ultraviolet ray of 100 to 190 nm, an ultraviolet ray of 190 to 380 nm, an electron beam, or the like, and the above-mentioned image display devices can be configured by combining these excitation sources and the phosphor of the present invention.

Since the phosphor of the present invention is excellent in the excitation efficiency by the electron beam, it is suitable for the application to the VFD, the FED, the SED, and the CRT, in which the acceleration voltage of the electron beam is at least 10 V and does not exceed 30 kV.

The FED is an image display device in which light emission is caused by bombarding the phosphor applied on the anode with electrons emitted and accelerated from the field emission cathode and it is required that the luminescence be made with a relatively low acceleration voltage not exceeding 5 kV so that the display device will be improved in the emission performance by combining phosphors of the present invention.

The present invention is described in more detail with examples to be shown below. However, these examples are disclosed only to facilitate understanding of the present invention with ease. Therefore, the present invention is not limited to these examples.

Example

As raw material, $Si_3N_4$, AlN, $Eu_2O_3$, and LaN were used. The raw material mixture was blended to yield a composition of $La_{1-x}Eu_xSi_9Al_{19}O_yN_{32-y}$ (here, $0 \leq x \leq 1$ and $y=x$). La nitride was used as a raw material of La substitution for charge compensation. The raw material mixture was fired in a gass-pressure furnace in a nitrogen atmosphere at a pressure of 10 atm at a temperature of 2000° C. for 4 hours.

Concretely, as raw material powders used to obtain a mixture, silicon nitride powder having a particle size of a specific surface area of 11.2 m²/g, containing 1.29 wt % of oxygen, and containing 95% α-type silicon nitride (SN-E10 grade manufactured by Ube Industries, Ltd.); aluminum nitride powder having a particle size of a specific surface area of 3.3 m²/g and containing 0.85 wt % of oxygen (F grade manufactured by Tokuyama Corporation); lanthanum nitride powder of 99.9% purity (manufactured by Wako Pure Chemical Industries, Ltd.); and europium oxide powder of 99.9% purity (manufactured by Shin-Etsu Chemical Co., Ltd.) were utilized. These raw materials were weighed and blended to obtain respective compositions in the above-mentioned formula: $La_{1-x}Eu_xSi_9Al_{19}O_yN_{32-y}$, wherein x=0, 0.01, 0.1, 0.3, 0.5, 0.7, and 0.9 (respectively corresponding to Examples 1, 2, 3, 4, 5, 6, and 7). More specifically, these powder raw materials were weighed in a glove box in which a nitrogen ambient atmosphere was prepared with 1 ppm or less of oxygen and moisture to obtain respective mixture compositions as prescribed in advance and the mixture compositions were mixed for 10 minutes with an agate mortar and an agate pestle made of boron nitride. Then, the thus-obtained mixtures were passed through a 500 μm sieve and allowed to fall naturally into a boron nitride crucible to fill in the crucible. The bulk density of the powder body was about 25% to 30%.

The respective crucibles containing the respective mixed powders were set in the gas-pressure furnace. In the firing operation, first the firing atmosphere was made vacuum of $10^{-3}$ Pa with a diffusion pump, and the furnace was heated from the room temperature to 800° C. at a rate of 500° C. per hour. Nitrogen of 99.999 vol % purity was introduced at 800° C. and the pressure was made to be 10 MPa. Then, the temperature was further raised to 2000° C. at a rate of 500° C. per hour. Then, the furnace was maintained at the temperature for 4 hours.

Figure 3:
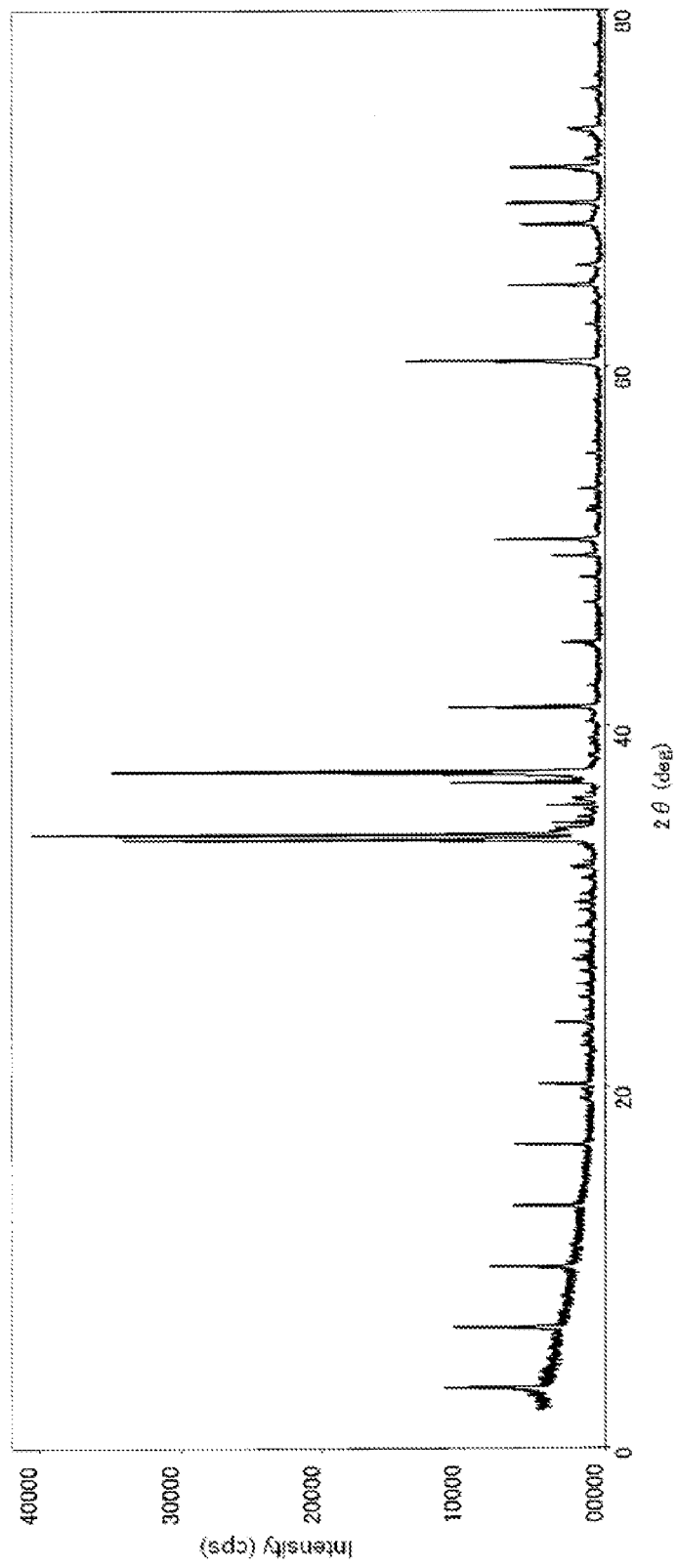
FIG. 3 is a diagram showing an X-ray diffraction pattern of Example 1.
Figure 4:
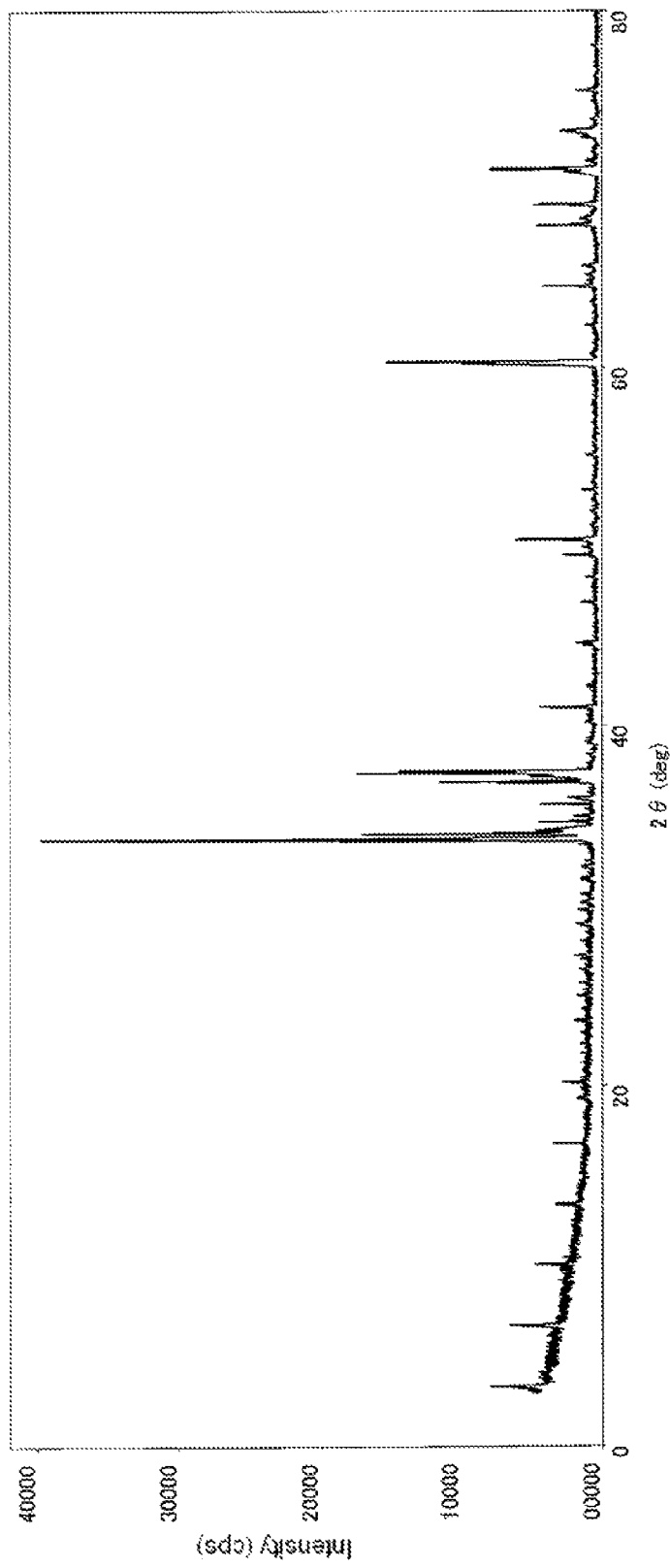
FIG. 4 is a diagram showing an X-ray diffraction pattern of Example 2.
Figure 5:
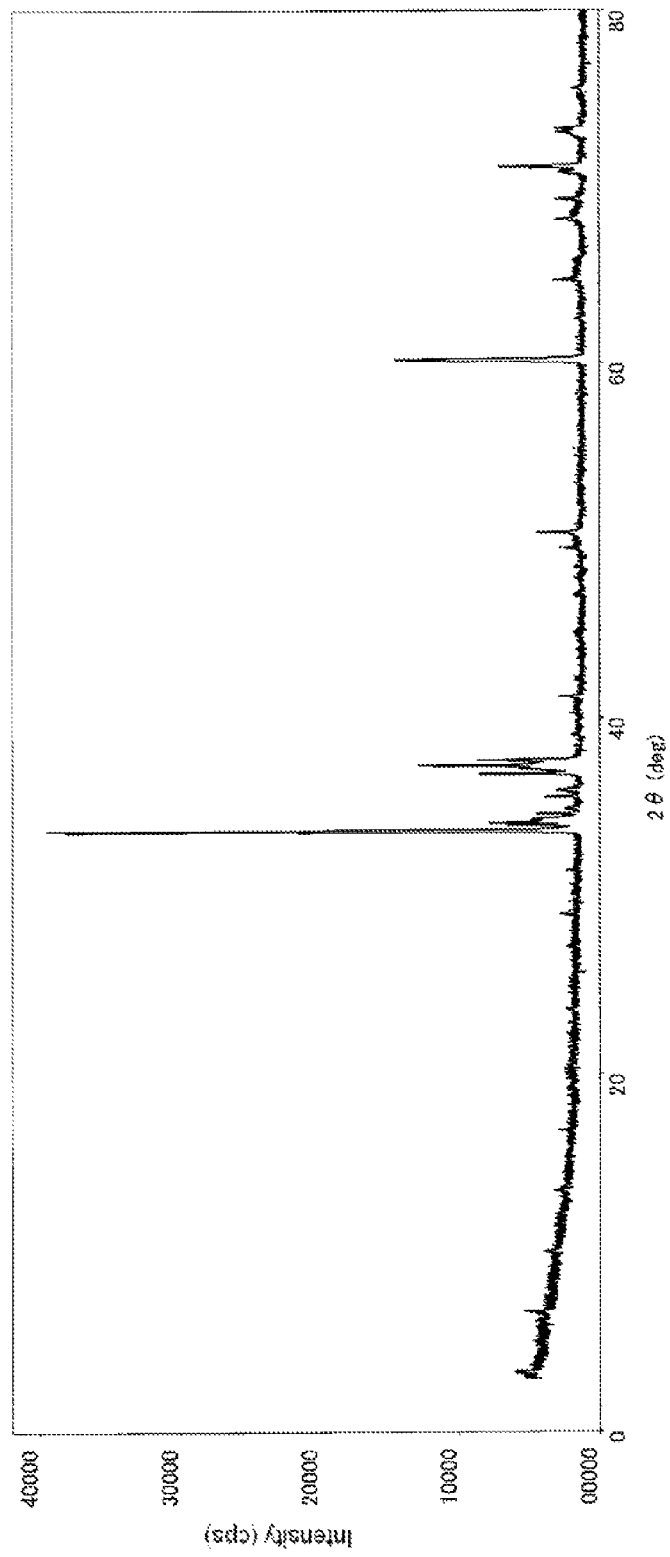
FIG. 5 is a diagram showing an X-ray diffraction pattern of Example 7.

The products obtained by firing were pulverized with a mortar made of boron nitride and the X-ray diffraction profiles of the respective products were measured with a powder X-ray diffractometer utilizing $K_\alpha$ line of copper such that respective crystal structures thereof were determined. It was confirmed that La sialon polytypoid existed therein from the X-ray diffraction profiles (FIGS. 3 to 5 show those of Examples 1, 2, and 7).

Next, with respect to the obtained products, excitation and emission spectra thereof were measured with a fluorescence spectrophotometer. The results are shown in FIG. 6.

Figure 6:
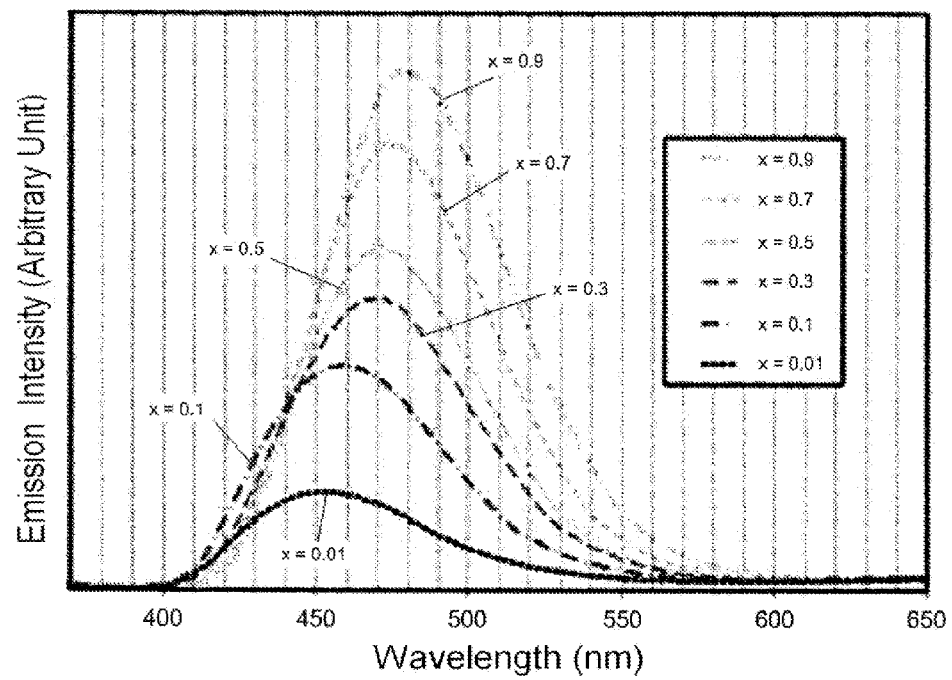
FIG. 6 is a diagram showing emission spectra in fluorescence measurements of Examples 2 to 7.

FIG. 6 is a diagram showing emission spectra of Examples 2 to 7 by the fluorescence measurement.

It was confirmed that the obtained products of Examples 1 to 7 were phosphors comprising inorganic crystals constituted of $La_{1-x}Eu_xSi_9Al_{19}O_yN_{32-y}$, and that the products of Examples 2 to 7 activated by Eu emitted light of a blue-green color. Further, according to FIG. 6, it was found that the emission intensity monotonously increased and the emission wavelength became longer with an increase of activation amount of Eu. It was also found that concentration quenching did not occur and that the products were stoichiometric phosphors in a similar manner as Sr sialon polytypoid (refer to Patent Reference 9). There was no significant difference found in the emission wavelength if compared with the case of Sr sialon polytypoid. Thus, it was suggested that the effect on the emission property of substitution of host element with respect to the sialon polytypoid would be small.

Comparative Example 1

As raw material powders, $Si_3N_4$, AlN, $Eu_2O_3$, and $CaCO_3$ were used. Concretely, the same silicon nitride powder, aluminum nitride powder, and europium oxide powder as mentioned above, and calcium carbonate of 99.9% purity (Kojundo Chemical Laboratory, reagent grade) were used. The raw material mixture was blended to obtain a composition in the formula: $Ca_{1-x}EU_xSi_9Al_{19}O_yN_{32-y}$ (here, $0 \leq x \leq 1$ and $y=1$). In the same way as described with Examples 1 to 7, the raw material mixture was fired in the gas-pressure furnace in a nitrogen atmosphere at the pressure of 10 atm at 2000° C. for 4 hours.

With respect to the product obtained by firing, the X-ray diffraction profile was measured with the powder X-ray diffractometer such that the crystal structure was identified. It was confirmed that α-sialon phase existed from the X-ray diffraction profile (not shown) and the existence of Ca sialon polytypoid was not confirmed.

INDUSTRIAL APPLICABILITY

The phosphor of the present invention exhibits emission of light of a violet color, a blue color, or a green color, and shows only a little deterioration in the brightness when exposed to an excitation source so as to be suitably utilized for a VFD, an FED, a PDP, a CRT, a white LED, and the like. In the future, it is expected that the phosphor of the present invention will be extensively utilized in various kinds of display devices using the electron beam as the excitation source, which will contribute to the development of the industry.

While the foregoing describes the present invention in relation to illustrations and examples, it is understood that it is not intended to limit the scope of the invention to the illustrations and examples described herein. On the contrary, it is intended to cover all alternative modifications and equivalents that may be included in the spirit and the scope of the invention as defined by the appended claims.

What is claimed is:

1. A phosphor comprising an inorganic crystal including: La, Si, Al, N (nitrogen), M element (M is at least one kind of element selected from a group consisting of Ce, Pr, Nd, Sm, Eu, Gd, Tb, Dy, Ho, Er, Tm, and Yb), and O (oxygen) if necessary;
    wherein said inorganic crystal comprises $LaSi_9Al_{19}N_{32}$ crystal or a solid solution crystal of $LaSi_9Al_{19}N_{32}$ crystal as a host crystal, which is activated by said M element.

2. The phosphor according to claim 1 wherein said host crystal is $LaSi_9Al_{19}N_{32}$ crystal.

3. The phosphor according to claim 1 wherein said inorganic crystal is $La_{1-x}M_xSi_9Al_{19}O_yN_{32-y}$ crystal (here, x satisfies: $0.001 \leq x \leq 0.99$ and y satisfies: $0.001 \leq y \leq 0.99$).

4. The phosphor according to claim 1 wherein said inorganic crystal is $La_{1-x}Eu_xSi_9Al_{19}ON_{32-y}$ crystal (here, x satisfies: $0.001 \leq x \leq 0.99$ and x=y).

5. The phosphor according to claim 1 wherein said inorganic crystal is $La_{1-x}Ce_xSi_9Al_{19}N_{32}$ crystal (here, x satisfies: $0.001 \leq x \leq 0.99$).

6. The phosphor according to claim 1 wherein an atomic fraction a of said La, an atomic fraction b of said Si, an atomic fraction c of said Al, an atomic fraction d of said O, an atomic fraction e of said N, and an atomic fraction f of said M element in said inorganic crystal satisfies:

$0.0001 \leq a \leq 0.03$ (i), $0.1 \leq b \leq 0.2$ (ii), $0.25 \leq c \leq 0.4$ (iii), $0 \leq d \leq 0.1$ (iv), $0.4 \leq e \leq 0.55$ (v), and $0.0001 \leq f \leq 0.02$ (vi).

7. The phosphor according to claim 6 wherein the atomic fraction a of said La, the atomic fraction b of said Si, the atomic fraction c of said Al, the atomic fraction d of said O, the atomic fraction e of said N, and the atomic fraction f of said M element satisfies:

$0.015 \leq a \leq 0.018$ (vii), $0.13 \leq b \leq 0.16$ (viii), $0.29 \leq c \leq 0.33$ (ix), $0 \leq d \leq 0.03$ (x), $0.48 \leq e \leq 0.52$ (xi), and $0.0005 \leq f \leq 0.01$ (xii).

8. The phosphor according to claim 1 wherein a peak wavelength of emission is in a wavelength range from 410 nm to 550 nm upon irradiation of an excitation source being any of an ultraviolet ray, a visible light ray, an electron beam, or an X-ray.

9. A lighting device comprising:
an emission light source to emit light of a wavelength from 250 to 440 nm; and
a phosphor to convert the light of the emission light source into light of a different wavelength,
wherein said phosphor includes a phosphor recited in claim 1.

10. An image display device comprising an excitation source and a phosphor wherein said phosphor includes a phosphor recited in claim 1.

* * * * *